United States Patent
Hemena et al.

(10) Patent No.: US 6,181,114 B1
(45) Date of Patent: Jan. 30, 2001

(54) BOOST CIRCUIT WHICH INCLUDES AN ADDITIONAL WINDING FOR PROVIDING AN AUXILIARY OUTPUT VOLTAGE

(75) Inventors: William Hemena, Raleigh; Randhir Malik, Cary, both of NC (US)

(73) Assignee: International Business Machines Corporation, Armonk, NY (US)

(*) Notice: Under 35 U.S.C. 154(b), the term of this patent shall be extended for 0 days.

(21) Appl. No.: 09/426,610

(22) Filed: Oct. 26, 1999

(51) Int. Cl.[7] .................. G05F 1/10; H02M 3/18
(52) U.S. Cl. .................. 323/222; 363/59
(58) Field of Search .................. 323/222, 224, 323/282, 284; 363/20, 21, 59, 101, 60

(56) References Cited

U.S. PATENT DOCUMENTS

| | | | |
|---|---|---|---|
| 5,504,418 | * 4/1996 | Ashley | 323/282 |
| 5,691,627 | * 11/1997 | Shum | 323/222 |
| 5,691,889 | * 11/1997 | Bazinet et al. | 363/89 |
| 6,037,754 | * 3/2000 | Harper | 323/222 |

* cited by examiner

Primary Examiner—Adolf Berhane
(74) Attorney, Agent, or Firm—Sawyer Law Group, LLP

(57) ABSTRACT

A boost circuit is disclosed. The circuit comprises a boost transistor, a pulse width modulator coupled to the boost transistor, and a boost inductor coupled to the boost transistor and the pulse width modulator, the boost inductor including a winding which provides an auxiliary output voltage. Through the use of the boost circuit in accordance with the present invention, the auxiliary output voltage is generated by the boost stage operation. Ergo, the present invention provides the auxiliary output voltage supply by using the same pulse width modulator and primary switching devices as used by the boost stage. The use of a boost circuit in accordance with the present invention thereby eliminates the need for the components required to maintain the auxiliary output voltage. Accordingly, system space can be saved and there is a reduction in manufacturing costs.

3 Claims, 5 Drawing Sheets

Boost and Chop and Flyback Aux power power power supply
An Auxiliary Bias Circuit in a Power supply FIG. 3  A low cost Auxilliary bias circuit derived from Boost stage

BOOST CIRCUIT WHICH INCLUDES AN ADDITIONAL WINDING FOR PROVIDING AN AUXILIARY OUTPUT VOLTAGE

FIELD OF THE INVENTION

The present invention relates generally to processing systems and specifically to a boost circuit for a processing system.

BACKGROUND OF THE INVENTION

Typically a power supply in a desktop computer requires the maintenance of an auxiliary output voltage for the operation of the service processor and for internal house keeping. This auxiliary output voltage is generally a separate small power supply within a power supply and is used to provide continuous current even when other power outputs are turned off However, this small power supply adds extra cost and instrumentation to the overall system.

FIG. 1 depicts a conventional auxiliary bias circuit in a power supply. The area enclosed by the dashed line contains a flyback auxiliary power supply 10. The remaining represents a boost circuit and a chopper circuit. The boost circuit and chopper circuit include a boost inductor 12, MOSFET transistors 16, 24, a pulse width modulator 18, capacitors 20, 44, a transformer 22, an inductor 42 and diodes 14, 38, 40. The flyback auxiliary power supply 10 includes a pulse width modulator 26, a transistor 28, a transformer 30, a diode 32, a capacitor 33, an error amplifier 34 and an opto-coupler 36.

To further understand the operation of a conventional auxiliary bias circuit in a power supply, please refer now to the flowchart of FIG. 2. First, the input voltage to the flyback 10 is provided by the boost voltage developed across the bulk capacitor 20, via step 102. Next, the pulse width modulator 26 is used to chop this voltage through transformer 30 and transistor 28 at a high switching frequency (100 kHz), via step 104. Transformer 30 then transforms the bulk voltage to the secondary side where it gets rectified by diode 32 and filtered by capacitor 33, via step 106. Finally, the error amplifier 34 regulates the output voltage by modulating the pulse width of pulse width modulator 26, via step 108.

Because the flyback auxiliary power supply 10 is segregated from the boost circuit, it requires a separate pulse width modulator 26, a separate transformer 30, and a separate MOSFET transistor 28 which increases the cost of the power supply system.

Accordingly, what is needed is a circuit that decreases the cost of the power supply system. The present invention addresses such a need.

SUMMARY OF THE INVENTION

A boost circuit is disclosed. The circuit comprises a boost transistor, a pulse width modulator coupled to the boost transistor, and a boost inductor coupled to the boost transistor and the pulse width modulator, the boost inductor including a winding which provides an auxiliary output voltage.

Through the use of the boost circuit in accordance with the present invention, the auxiliary output voltage is generated by the boost stage operation. Ergo, the present invention provides the auxiliary output voltage supply by using the same pulse width modulator and primary switching devices as used by the boost stage. The use of a boost circuit in accordance with the present invention thereby eliminates the need for the components required to maintain the auxiliary output voltage. Accordingly, system space can be saved and there is a reduction in manufacturing costs.

DETAILED DESCRIPTION

The present invention relates to an improved boost circuit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The present invention provides for a boost circuit that also provides an auxiliary output voltage. In accordance with the present invention, the auxiliary output voltage supply uses the same pulse width modulator and primary switching devices that are used by the boost stage. The use of a boost circuit in accordance with the present invention thereby eliminates the need for the components required to maintain the auxiliary output voltage. This saves space and reduces manufacturing costs.

Figure 1:
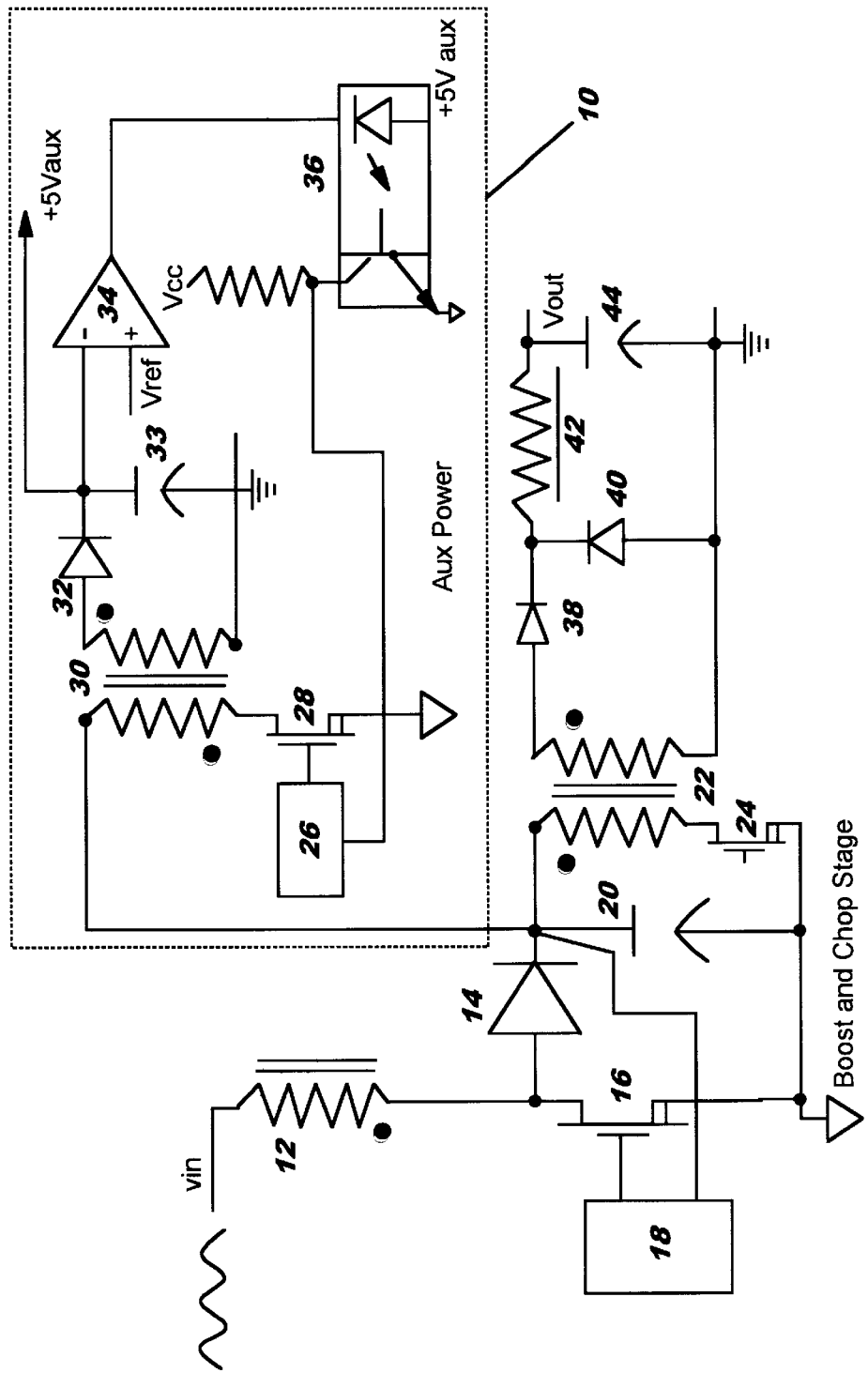
FIG. 1 depicts a conventional auxiliary bias circuit in a power supply.
Figure 2:
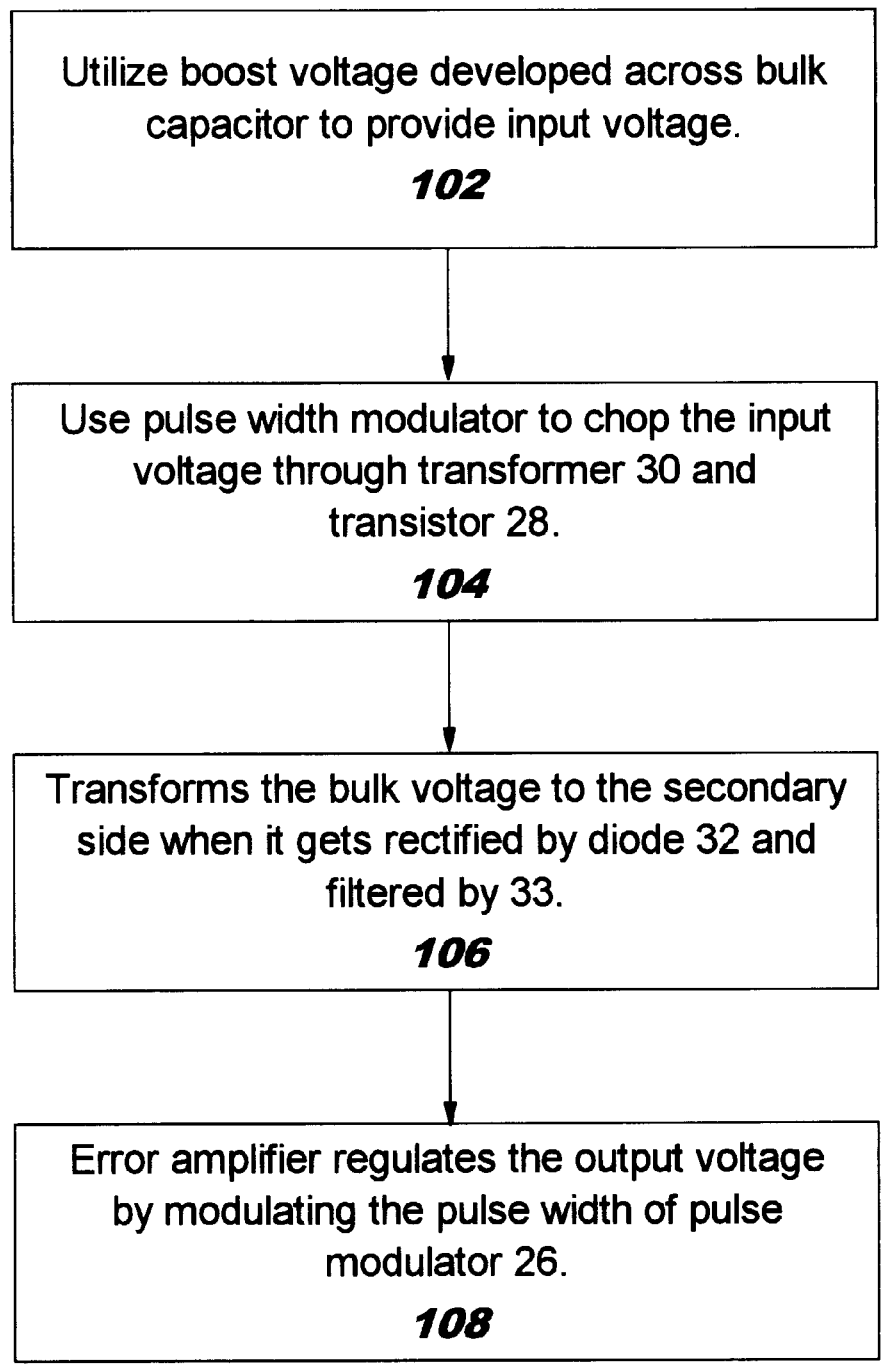
FIG. 2 shows a flowchart of the operation of a conventional auxiliary bias circuit in a power supply.
Figure 3:
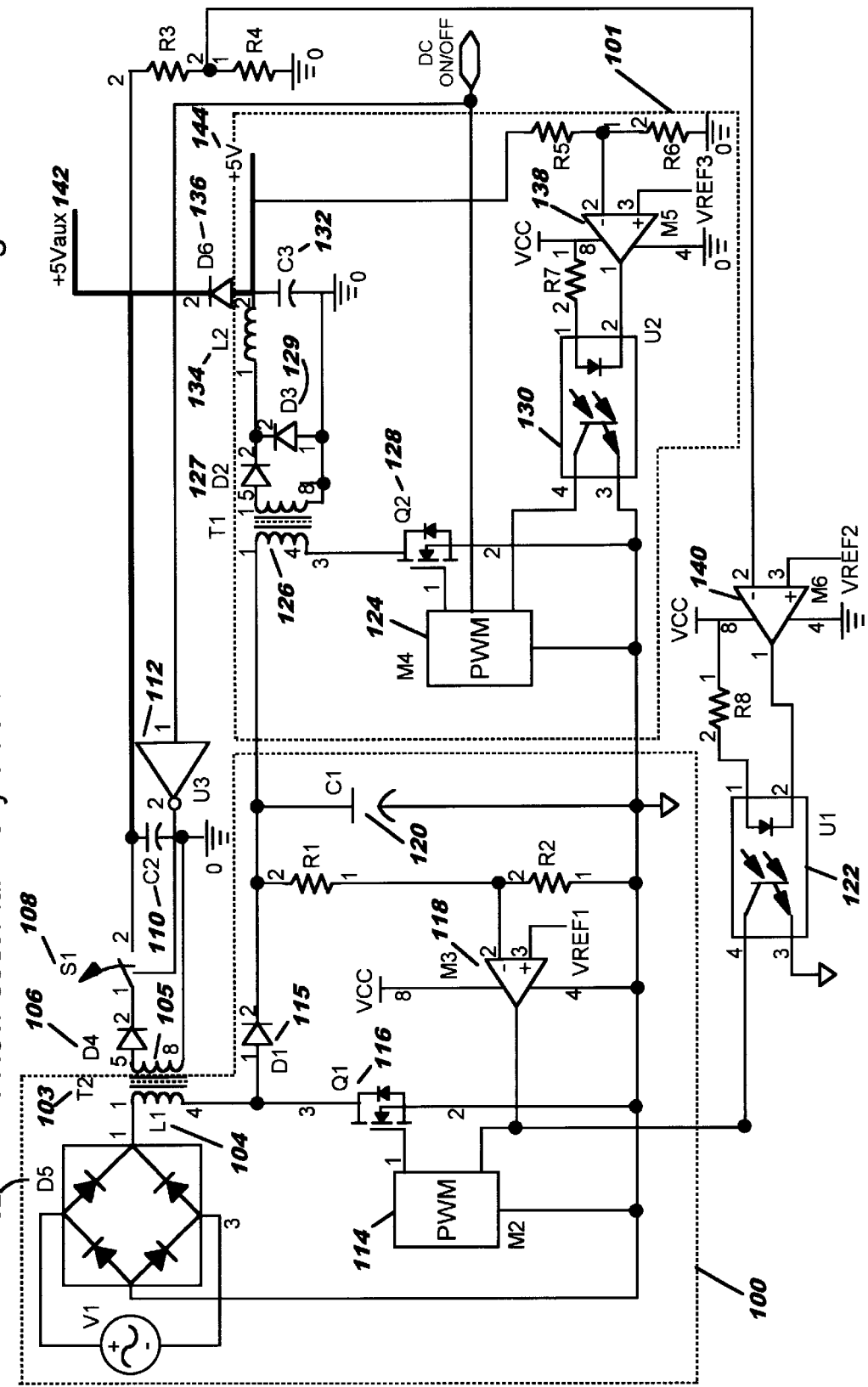
FIG. 3 shows a diagram of the boost circuit in accordance with the present invention.

FIG. 3 illustrates a diagram of the circuit in accordance with the present invention. The circuit includes a boost portion 100 and chopper portion 101. The remaining portion is the auxiliary output voltage portion. The boost portion 100 includes a rectifier bridge 102, a primary winding inductor 104 of transformer 103, a MOSFET transistor 116, an error amplifier 118, a pulse width modulator 114, a boost diode 115 and a filter capacitor 120. The chopper portion includes a transformer 126, a switching transistor 128, a pulse width modulator 124, rectifying diodes 127 and 129, a filter inductor 134, a filter capacitor 132, an error amplifier 138 and an opto-coupler 130. The auxiliary output voltage portion includes a secondary winding 105 of transformer 103, a diode 106, a switch 108, a capacitor 110, an isolating diode 136, an error amplifier 140 and an opto-coupler 122. Unlike the conventional boost stage circuit however, the boost inductor 104 has an additional winding 105 which is used to provide an isolated auxiliary output across capacitor 110 at a time when the DC on/off switch is in the off state. During this time, no output except the auxiliary bias output is available from the power supply.

The additional winding 105 is preferably two or three turns and adds very little cost to the construction of transformer 103. As a result, the auxiliary output voltage portion uses the same pulse width modulator 114, primary switching devices and the magnetic device that is used by the boost portion 100. Consequently, the need for a separate pulse width modulator, transformer, and MOSFET transistor is eliminated.

Figure 4:
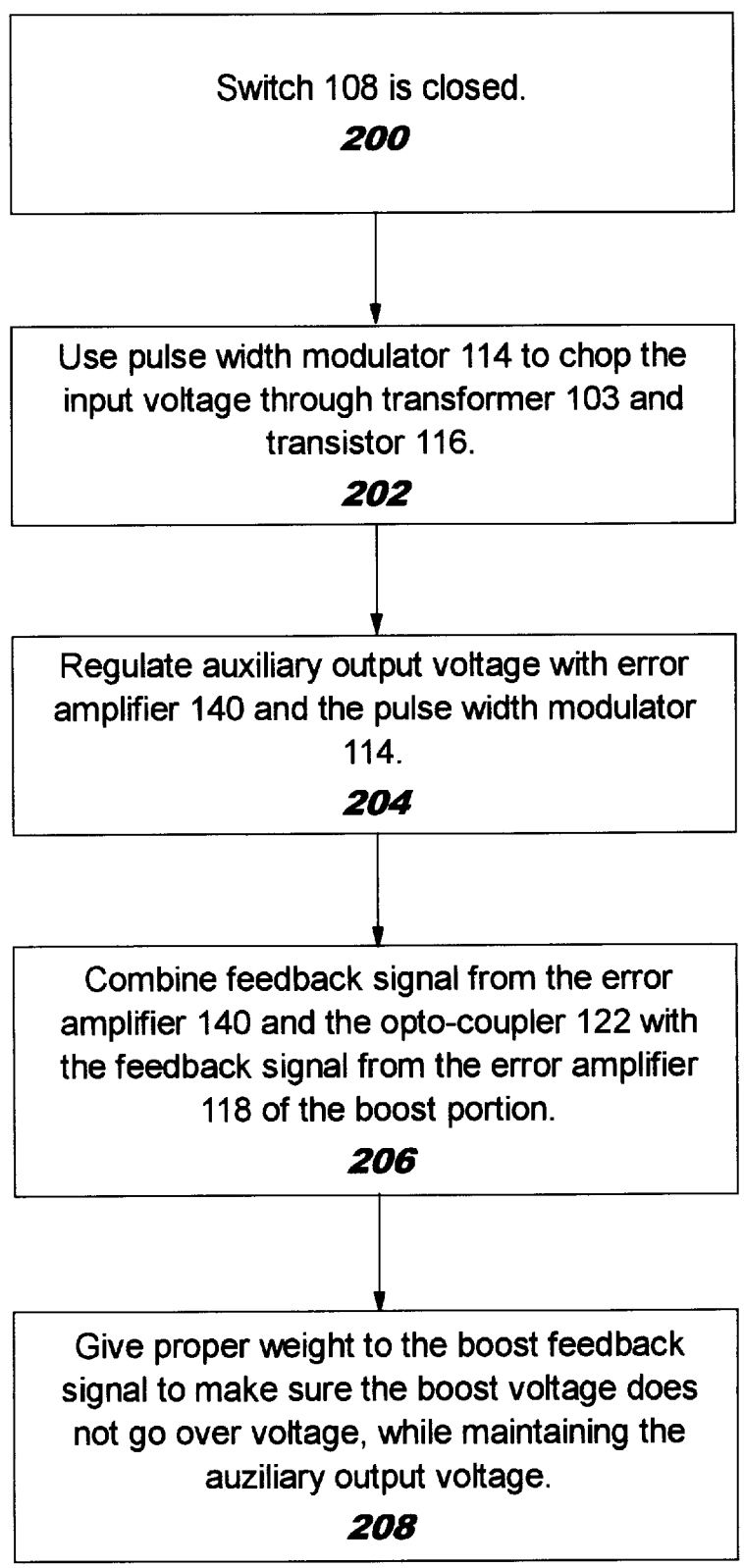
FIG. 4 is a flow diagram of the operation of the boost circuit in accordance with the present invention when the DC on/off switch is in the off state.

For a better understanding of the operation of the present invention, FIG. 4 is a flow diagram of the operation of the auxiliary bias circuit in accordance with the present invention when the DC on/off switch in the off state. Referring now to FIG. 3 and FIG. 4 together, first, switch 108 is closed, via step 200. When switch 108 is closed, the pulse width modulator 114 is used for chopping the full wave rectified voltage through the transformer 103, and transistor 116, via step 202. The auxiliary output voltage is then regulated by the error amplifier 140 and pulse width modulator 114, via step 204. The feedback signal from the error amplifier 140 and via the opto-coupler 122 is then combined with the feedback signal from the error amplifier 118 of the boost portion 100, via step 206. Next, switch 108 is opened for normal operation, via step 207. Finally, a proper weight is given to the boost feedback signal and the auxiliary feedback to make sure the boost voltage does not go over-voltage (OV) while maintaining the auxiliary output voltage within regulation, via step 208.

Figure 5:
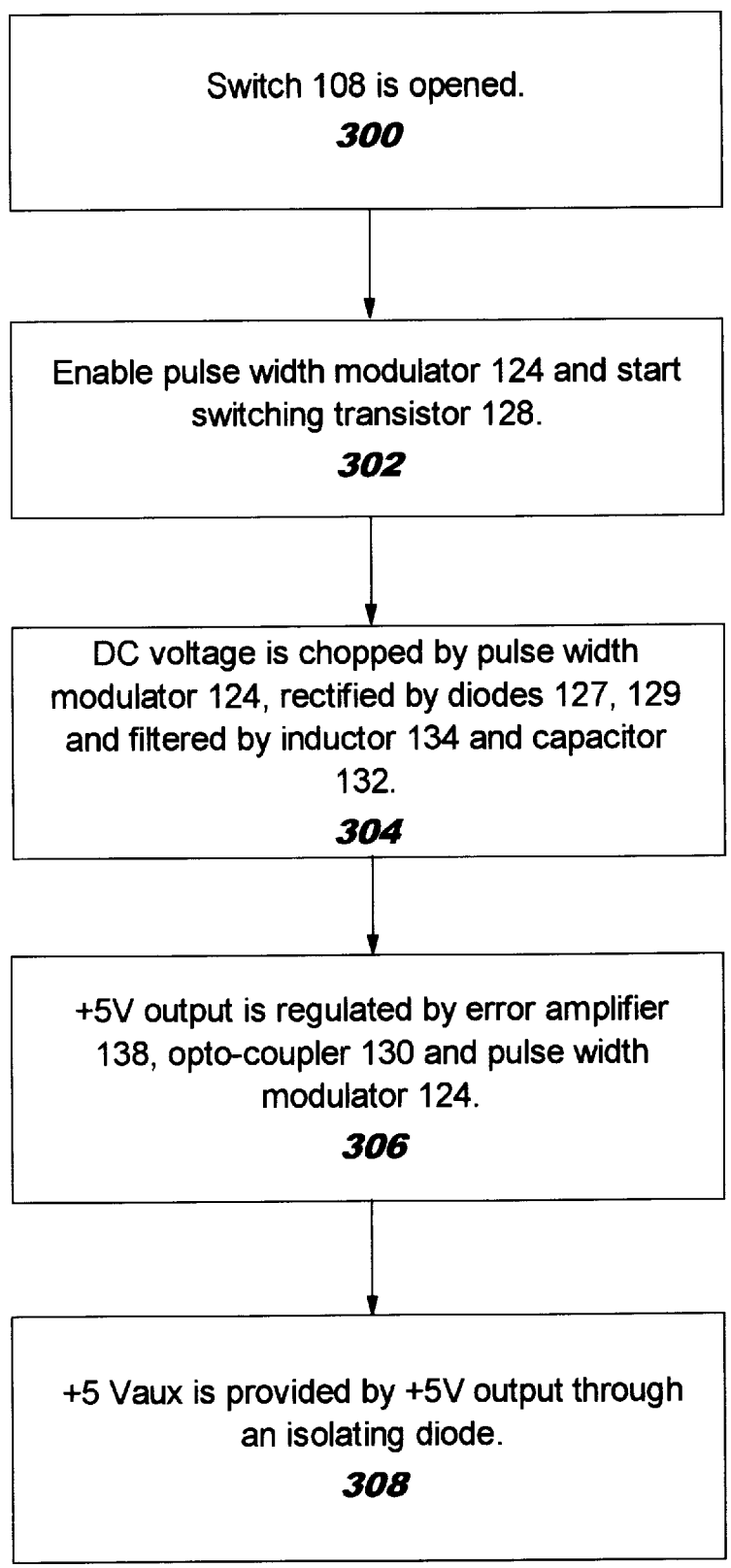
FIG. 5 is a flow diagram of the operation of the boost circuit in accordance with the present invention when the DC on/off switch is in the on state.

For a better understanding of the operation of the circuit when the DC on/off switch is in the on state, please refer to FIG. 3 and the flowchart of FIG. 5. First, switch 108 is opened, via step 300. Accordingly, transformer 103 will behave as an inductor 104. Under this condition, the pulse width modulator 124 is enabled and will start switching transistor 128, via step 302. The DC voltage developed across bulk capacitor 120 is then chopped by pulse width modulator 124, rectified by diodes 127 and 129, and filtered by inductor 134 and capacitor 132, via step 304. The +5V output 144 is then regulated by the error amplifier 138, the opto-coupler 130 and modulator 124, via step 306. Finally, the +5V aux voltage 142 is provided by the main +5V output 144 through an isolating diode, via step 308. This is preferably a Schottky diode.

As the +5V aux voltage 142 is lower during the standby mode of operation, the error amplifier 140 output will stay high and the opto-coupler 122 stays off. Therefore during normal operation, the +5V aux 142 is provided by the +5V main output 144 and the boost feedback signal is not affected by the auxiliary feedback signal.

Through the use of the boost circuit in accordance with the present invention, the auxiliary output voltage is generated by the boost stage operation. Ergo, the present invention provides the auxiliary output voltage supply by using the same pulse width modulator and primary switching devices as used by the boost stage. The use of a boost circuit in accordance with the present invention thereby eliminates the need for the components required to maintain the auxiliary output voltage. Accordingly, system space can be saved and there is a reduction in manufacturing costs.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A boost circuit comprising;
    a boost transistor;
    a pulse width modulator coupled to the boost transistor wherein the pulse width modulator is utilized for chopping a voltage through the boost inductor and the boost transistor;
    a boost inductor, coupled to the boost transistor and the pulse width modulator, the boost inductor including a winding which provides an auxiliary output voltage;
    a first error amplifier coupled to the boost inductor wherein the auxiliary output voltage is regulated by the first error amplifier and the pulse width modulator; and
    an opto coupler coupled to the first error amplifier and a second error amplifier, wherein a feedback signal from the first error amplifier and the opto coupler is combined with a feedback signal from the second error amplifier.

2. The circuit of claim 1 wherein a main power output voltage is lower than the auxiliary output voltage.

3. A boost circuit comprising;
    a boost transistor;
    a pulse width modulator coupled to the boost transistor;
    a boost inductor, coupled to the boost transistor and the pulse width modulator, the boost inductor including a winding which provides an auxiliary output voltage, wherein the pulse width modulator is utilized for chopping a main power output voltage through the boost inductor and the boost transistor wherein the main power output voltage is lower than the auxiliary output voltage;
    a first error amplifier coupled to the boost inductor wherein the auxiliary output voltage is regulated by the first error amplifier and the pulse width modulator; and
    an opto coupler coupled to the first error amplifier and a second error amplifier, wherein a feedback signal from the first error amplifier and the opto coupler is combined with a feedback signal from the second error amplifier.

* * * * *